United States Patent
Dong et al.

(10) Patent No.: US 10,388,959 B2
(45) Date of Patent: Aug. 20, 2019

(54) PEO-PVA BASED BINDER FOR LITHIUM-SULFUR BATTERIES

(71) Applicant: GM GLOBAL TECHNOLOGY OPERATIONS LLC, Detroit, MI (US)

(72) Inventors: Yingnan Dong, Warren, MI (US); Mei Cai, Bloomfield Hills, MI (US); Li Yang, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 15/623,457

(22) Filed: Jun. 15, 2017

(65) Prior Publication Data

US 2018/0366730 A1 Dec. 20, 2018

(51) Int. Cl.
| | |
|---|---|
| *H01M 4/62* | (2006.01) |
| *H01M 4/04* | (2006.01) |
| *H01M 4/36* | (2006.01) |
| *H01M 4/38* | (2006.01) |
| *H01M 10/0525* | (2010.01) |
| *H01M 10/0569* | (2010.01) |
| *H01M 10/0568* | (2010.01) |
| *H01M 4/66* | (2006.01) |

(52) U.S. Cl.
CPC ......... *H01M 4/622* (2013.01); *H01M 4/0404* (2013.01); *H01M 4/364* (2013.01); *H01M 4/382* (2013.01); *H01M 4/661* (2013.01); *H01M 10/0525* (2013.01); *H01M 10/0568* (2013.01); *H01M 10/0569* (2013.01); *H01M 2300/0037* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,937,481 | B1* | 4/2018 | Liu | H01M 4/23 |
| 2002/0012846 | A1* | 1/2002 | Skotheim | H01M 2/1673 |
| | | | | 429/231.95 |
| 2010/0104948 | A1* | 4/2010 | Skotheim | H01M 4/02 |
| | | | | 429/322 |
| 2014/0272569 | A1 | 9/2014 | Cai et al. | |
| 2015/0056507 | A1 | 2/2015 | Dadheech et al. | |
| 2015/0162583 | A1* | 6/2015 | Dadheech | H01M 2/145 |
| | | | | 429/144 |
| 2015/0162596 | A1* | 6/2015 | Dadheech | H01M 4/0419 |
| | | | | 429/231.95 |
| 2015/0236324 | A1* | 8/2015 | Xiao | H01M 2/1686 |
| | | | | 429/144 |

(Continued)

*Primary Examiner* — Kaity V Chandler
(74) *Attorney, Agent, or Firm* — Reising Ethington P.C.

(57) ABSTRACT

In the formation of cathodes for lithium-sulfur battery cells, it is often desired to form the cathodes by resin-bonding particles of a sulfur-based cathode material as a porous cathode material layer on the surface(s) of a suitable metal current collector. It is found that the use of a copolymer of polyethylene oxide and polyvinyl alcohol, dissolved in water, provides a resin-particle slurry that is readily spreadable onto the current collector surface to form a uniform layer of porous cathode material particles. And upon evaporation of the water, the copolymer-bonded, sulfur-based particle coated cathodes function very well in assembled lithium-sulfur cells.

20 Claims, 2 Drawing Sheets

(56) References Cited

U.S. PATENT DOCUMENTS

| | | | |
|---|---|---|---|
| 2015/0236343 A1* | 8/2015 | Xiao | H01M 10/0525 |
| | | | 429/217 |
| 2015/0246816 A1* | 9/2015 | Liu | H01M 4/13 |
| | | | 216/39 |
| 2015/0349307 A1* | 12/2015 | Dadheech | H01M 2/145 |
| | | | 427/446 |
| 2016/0149206 A1* | 5/2016 | Liu | H01M 4/134 |
| | | | 429/218.1 |
| 2016/0149218 A1* | 5/2016 | Liu | H01M 4/38 |
| | | | 429/335 |
| 2016/0365558 A1* | 12/2016 | Kia | H01M 2/1686 |
| 2017/0062812 A1* | 3/2017 | Kim | H01M 4/8807 |
| 2017/0162859 A1* | 6/2017 | Yang | H01M 4/38 |

* cited by examiner

PEO-PVA BASED BINDER FOR LITHIUM-SULFUR BATTERIES

TECHNICAL FIELD

Particulate sulfur-containing cathode materials for lithium-sulfur electrochemical cell batteries are effectively resin-bonded to a metallic current collector foil using an aqueous solution of a polyethylene oxide-polyvinyl alcohol copolymer binder. The binder-water solution facilitates the application and formation of the porous coating layers of active cathode particles on the surface(s) of the current collector. And the dried bonder composition enhances the subsequent performance of the assembled lithium-sulfur battery cell.

BACKGROUND OF THE INVENTION

Lithium-based battery cells are finding increasing use as a source providing electrical power for drive motors in automobiles and in power-requiring tools and devices for many consumer applications. In many such battery cells, the anode (negative electrode during cell discharge) is formed of lithium, or a lithium compound, or a lithium-intercalating material such as graphite. And the cathode (positive electrode during cell discharge) is formed of a composition that reversibly accepts lithium ions released from the anode during cell discharge. Many combinations of such active anode material compositions, cathode material compositions, and non-aqueous electrolyte compositions, conductive of lithium ions, have been considered for use in lithium-based battery cells.

A battery cell using the combination of a lithium metal anode and sulfur particles (or sulfur-based particles) as a cathode material has the potential of providing a very high gravimetric energy density, Wh/kg or mAh/cm$^2$. However, actually obtaining such properties in a prepared battery cell, and retaining such properties as the cell is repeatedly discharged and recharged, is a challenge.

There remains a need for improvements in the methods and practices by which lithium metal-sulfur-based battery cells are prepared. It is found that the preparation of the sulfur particle-containing cathode continues to require consideration and improvement.

SUMMARY

This disclosure provides a significant improvement in the preparation of a sulfur cathode for a lithium metal-sulfur battery cell. The cathode material often comprises particles of a sulfur-based composition. The sulfur may, for example, be utilized as very small particles of elemental sulfur retained in pores of larger carbon particles. The sulfur-based particles are resin-bonded onto the surface(s) of a thin metal current collector foil (often an aluminum foil) in suitably porous layers of predetermined, generally uniform thickness. This requires the use of a suitable solution or dispersion of a carbon-based polymeric binder composition which can be readily mixed with the particles of sulfur-based cathode material for efficient and effective formation of the porous layer of cathode particulate material on the current collector foil surfaces. Preferably the solvent is water. And, at the completion of the coating step and the removal of the solvent, the thin distributed coating of polymeric binder material must be compatible with the particles of cathode material and with the selected electrolyte composition to enable repeated flow of lithium ions into and out of the sulfur content of the cathode material.

Such a cathode structure is often formed as a relatively thin, round or rectangular layer and used in combination with a like-shaped lithium anode structure. The lithium anode may consist of a thin foil of lithium metal or it may be formed of micrometer-size particles of lithium, resin-bonded to a copper current collector foil. One or more pairs of an anode and cathode are aligned with facing electrode material layers placed (e.g., stacked or rolled) against the opposing surfaces of a like-sized and shaped, thin, porous separator layer. The porous separator may be formed, for example, of a suitable polymeric electrical insulator, such as polypropylene. The pores of the respective electrode material layers and the separator(s) are infiltrated with a suitable lithium electrolyte composition, such as, e.g., lithium bis (trifluoromethane sulfonyl) imide, LiTFSI, dissolved as a 1M solution, with LiNO$_3$, 0.2M, each in a non-aqueous organic solvent (such as equal volumes of 1,2-dimethyloxy-ethane and dioxolane). As will be described in more detail below in this specification, the separator prevents physical contact (electrical shorting) between the facing electrodes, but enables a suitable flow of lithium ions between the lithium anode and the sulfur-based cathode material. In accordance with this disclosure, the method of forming the resin-bonded layer of particulate sulfur-based cathode material is important.

In accordance with this disclosure, a particulate carbon/sulfur composite is prepared as the main active constituent of the cathode material. The carbon-sulfur particle composite is prepared by initially mixing micrometer-size particles of elemental sulfur with particles of a porous carbon. Suitably, the porous carbon is a commercial carbon having specified average particle sizes of 50 nm and a porosity of 800 m$^2$/g. A weight ratio of 25 parts carbon particles to 75 parts sulfur particles provides a suitable mixture. Mechanical mixing may be employed and the mixed particles may be subjected to a mild milling operation. Then, the mixture of sulfur particles and carbon particles is heated to a suitable temperature (e.g., about 155° C.) under vacuum to melt the sulfur particles and to enable the molten elemental sulfur to diffuse into the pores of the carbon particles to form a particulate carbon/sulfur composite. Preferably, a relatively small amount (e.g., about two weight percent) of graphite particles is also mixed with the carbon/sulfur composite particles in preparation for the mixture to be resin-bonded as a porous layer of cathode material on the surface of, for example, an aluminum foil cathode current collector. The selection of the polymeric binder is important in the both the formation of the porous layer of carbon/sulfur composite particles and intermixed graphite particles on the surface(s) of the current collector foil and in the function of the completed cathode in its functioning battery cell environment.

In accordance with practices of this disclosure, a copolymer of polyvinyl alcohol (PVA) and polyethylene oxide (PEO) is dissolved (or dispersed) in water to form, for example, a five-weight percent solution of the copolymer binder in the water. A suitable PVA-PEO copolymer is commercially available as Kollicoat® IR (BASF). The copolymer has a molecular weight of approximately 45,000 Daltons and consists of about 75% polyvinyl alcohol units and 25% of polyethylene oxide units. The polymer is sometimes also characterized as a polyvinyl alcohol-polyethylene glycol graft copolymer. The copolymer molecular structure is characterized by main backbone segments of polyethylene oxide carrying pendent groups or branches of polyvinyl alcohol moieties.

In accordance with our previous experience, we had discovered that the use polyvinyl alcohol alone as a binder provided useful properties in the sulfur-based cathode and electrolyte, but PVA made very difficult the initial application of a suitable layer of the cathode particles to a surface of the aluminum current collector. And the use of polyethylene oxide alone, facilitated formation of the porous layer of particulate cathode material, but had an adverse function on cathode performance in an assembled battery cell.

It is desired to mix the aqueous binder solution with the carbon/sulfur composite/graphite particles in an amount that will provide a workable and movable slurry of the binder-wetted, electrode material when applying the slurry to the surface of a current collector. This molecular structure of the PVA-PEO copolymer is such that the a five-weight percent solution in water is readily mixed with the sulfur-based particles of cathode material such that the resulting wet slurry of particles is readily applied to a surface (or surfaces) of a working section of current collector foil from which individual cathode members may be cut and assembled into lithium-sulfur battery cells. When the slurry has been applied to a surface of the current collector to a predetermined uniform wet thickness, the water is evaporated to form a porous resin-bonded particulate cathode layer having a dry thickness up to, for example, about one hundred micrometers. Suitable thicknesses of cathode material are typically in the range of about fifty to two hundred fifty micrometers. The formed sulfur-based cathode is assembled with a lithium metal anode, one or more porous separators and a lithium ion-containing electrolyte solution in a functional battery cell. The dry porous coating of cathode material particles is found to be compatible with lithium electrolyte solutions and to remain stable over repeated discharge and re-charge cycles of the battery cell.

Other insights and advantages of this cathode preparation method and resulting cathode structure will be apparent from the following examples and detailed specifications for the practice of the method and the use of the cathode structure.

BRIEF DESCRIPTION OF THE DRAWINGS

FIG. 1 also presents like (i) first charge data and (ii) first discharge data curves (dashed black line data curves) for a lithium/sulfur cell in which the cathode was prepared using PEO-PVA copolymer as the binder for the carbon/sulfur composite cathode material. A complete description of the cells is presented below in this specification.

DESCRIPTION OF PREFERRED EMBODIMENTS

Figure 1:
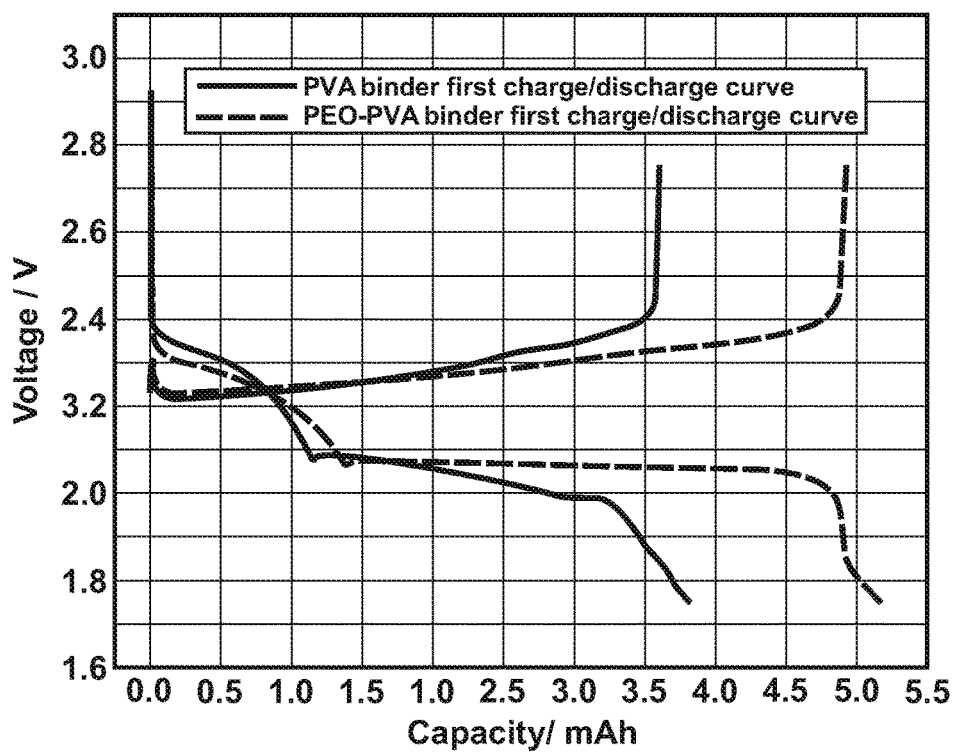
FIG. 1 is a graph of Voltage (V), vertical axis, v. cell Capacity in mAh, horizontal axis, presenting (i) the first charge curve (upwardly extending solid black line data curve) and (ii) the first discharge curve (downwardly extending solid black line data curve for a lithium/sulfur cell in which the cathode was prepared using only polyvinyl alcohol (PVA) as the binder for the carbon/sulfur composite cathode material.

A lithium-sulfur battery cell was prepared as follows.

A lithium anode was prepared using a round lithium metal foil having a diameter of fifteen millimeters and a thickness of 460 micrometers.

A like-shaped cathode (with a like diameter) of carbon-sulfur composite particles was prepared. The carbon-sulfur particle composite was prepared by initially mixing micrometer-size particles of elemental sulfur with particles of porous carbon having average particle sizes of 50 nm and a porosity of 800 m$^2$/g. Twenty-five parts by weight of carbon particles were mixed with seventy-five parts by weight of sulfur particles. The particles were mechanically mixed and ground in a mortar and pestle. Then, the mixture of sulfur particles and carbon particles was heated to a suitable temperature of 155° C. under vacuum to melt the sulfur particles and to cause the molten elemental sulfur to infiltrate and diffuse into the pores of the carbon particles to form particles which were a composite of carbon and sulfur. The sulfur is believed to be fully infused into the very porous carbon particles. And it appears that the resulting composite carbon-sulfur particles are not greatly increased in size from their initial average size of about thirty nanometers. Again, the proportion of sulfur to carbon in these composite particles was essentially three to one. Two weight percent of graphite particles were mixed with the carbon/sulfur composite particles in preparation for the mixture to be resin-bonded as a porous layer of cathode material on the surface of an aluminum foil cathode current collector.

A commercially available (source, Sigma Aldrich) copolymer of polyvinyl alcohol (PVA) and polyethylene oxide (PEO) was dissolved (or dispersed) in water to form, for example, a five-weight percent solution of the copolymer binder in the water. The copolymer molecular structure was characterized by main backbone segments of polyethylene oxide carrying pendent groups or branches of polyvinyl alcohol moieties and a molecular weight of about 45,000 Daltons. The five-weight percent aqueous solution of the copolymer was readily mixed with the combined particles of active cathode material and graphite to form a wet slurry of the particles and copolymer solution. The slurry was readily applied to the surfaces of an aluminum current collector foil. As a generally uniformly thick layer of the copolymer resin-composite carbon/sulfur particle-graphite mixture. The water was evaporated to form a resin-bonded porous particulate cathode layer having a dry thickness of about 100 micrometers. The formed sulfur-carbon cathode was assembled with an above-prepared lithium metal anode, an interposed polypropylene separator. The electrode members and separator of the assembled cell were infiltrated with a solution of 1M solution of LiTFSI and 0.2M solution of LiNO$_3$ in a solvent consisting of a 1:1 mixture by volume of 1,2-dimethoxyethane and dioxolane.

The assembled cell is an example of a practice of this invention in using the PVA-PEO copolymer binder in the preparation of a sulfur-based cathode material for use in combination with a lithium metal-based anode. Properties of thus-prepared battery cells were tested and, as described below in this specification, the data summarized graphically in FIGS. 1 and 2 of this specification.

For purposes of comparison, a group of assembled cells were prepared, each with a lithium metal anode and a cathode of polyvinyl alcohol (PVA) resin-bonded carbon/sulfur and graphite particles. These comparison cells were essentially identical to the above described set of lithium/sulfur cells except for the composition of the resin binder. In this set of comparison cells, the binder was PVA, not the above described copolymer of PVA and PEO.

Further, for purposes of a second type of comparison, a group of like-sized lithium-ion battery cells were prepared. These cells were formed with graphite anodes, lithium-nickel-manganese-cobalt oxide (NMC) cathodes and an electrolyte which was a 1M solution of $LiPF_6$ in a 3:7 v/v mixture of ethylene carbonate and ethyl methyl carbonate. The anode was formed of ninety-six parts by weight of the graphite particles which were mixed with two parts of carbon black and this mixture resin-bonded to a copper current collector with two parts by weight of a resin consisting of equal parts by weight of carboxymethyl cellulose and styrene-butadiene rubber. The cathode was prepared of a mixture of ninety-seven parts by weight of NMC particles and one part by weight carbon black particles which were resin-bonded to an aluminum current collector foil with two parts by weight of polyvinylidene difluoride. These lithium-ion battery cells were carefully made to provide battery cell properties representative of present lithium-ion battery cells.

In the graph of FIG. 1 a first charge curve (dashed black data line) and discharge curve (dashed black data line) is presented for the lithium-sulfur cell in which the composite carbon/sulfur particles were resin bonded with the PVA-PEO copolymer resin to an aluminum current collector foil as described above in this text. For purposes of comparison, a first charge curve (solid black data line) and discharge curve (solid black data line) is presented for a substantially identical lithium-sulfur cell in which the composite carbon/sulfur particles were resin bonded with only a polyvinyl alcohol (PVA) polymer resin to an aluminum current collector foil.

In FIG. 1 the discharge curves for both cells start at the same voltage and energy capacity. But the cell in which the cathode material was bonded with the PVA-PEO copolymer had adsorbed and delivered a much greater energy capacity (5.2 mAh as compared with 3.7 mAh for the PVA bonded carbon-sulfur composite particle cathode). While the use of PVA as a binder for the cathode materials facilitates the making of the cathode structure, the PVA binder does not function well during cell charge and discharge. Our collective data has indicated that the use of the PVA-PEO copolymer binder in the cathode both enables preparation of the cathode material coatings on the current collector, but further enhances the actual capacity and performance of the cell.

Figure 2:
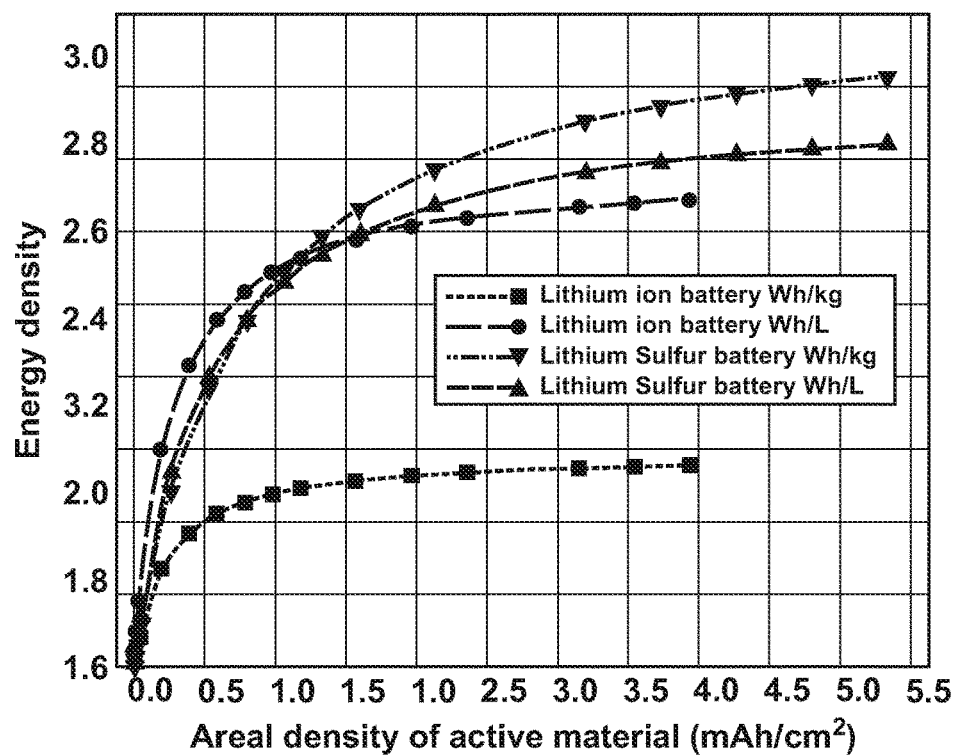
FIG. 2 is a graph of Energy Density (Wh/kg or Wh/L, vertical axis) v. Areal density of active material, the active material loading on the cathode specimen, (mAh/cm$^2$) for a subject lithium-sulfur battery (medium dash and dot-dot-dash black data lines) and for a representative lithium-ion battery (shortest and longest black dash data lines). The data curves with the triangle data points present lithium-sulfur battery data. And the data curves with square or circular data points present lithium ion battery data. A complete description of the cells is presented below in this specification.

Energy density data for the above-prepared lithium ion battery and the lithium-sulfur battery (in which the sulfur-based cathode materials are bonded with PVA-PEO copolymer) were obtained by testing and are compared in FIG. 2. As indicated by the respective energy density curves, Wh/kg and Wh/L, the lithium sulfur battery delivers a much higher gravimetric energy density (Wh/kg) than the lithium ion battery. And as the loading of active electrode material ($mAh/cm^2$) in the respective batteries was increased, the energy density of the lithium-sulfur battery continually increased with respect to the lithium ion battery.

Further as seen in the data of FIG. 2—although both the lithium ion battery and the lithium sulfur batter display good volume energy density (Wh/L), as their electrode loadings are increased, the lithium sulfur battery displays better volume energy density.

In the above described description of the sulfur-based cathode material using a PVA-PEO copolymer binder resin, the use of specific materials such as the specific porous carbon, the electrolyte, and the solvents for the electrolyte were identified. Those skilled in the art will recognize that other carbon supports and electrolyte materials may be used in combination with a suitable sulfur-based cathode material and its polyvinyl alcohol-polyethylene oxide copolymer binder material. For example, different size carbon particles with different pore volumes and surface areas may be used.

Figure 3:
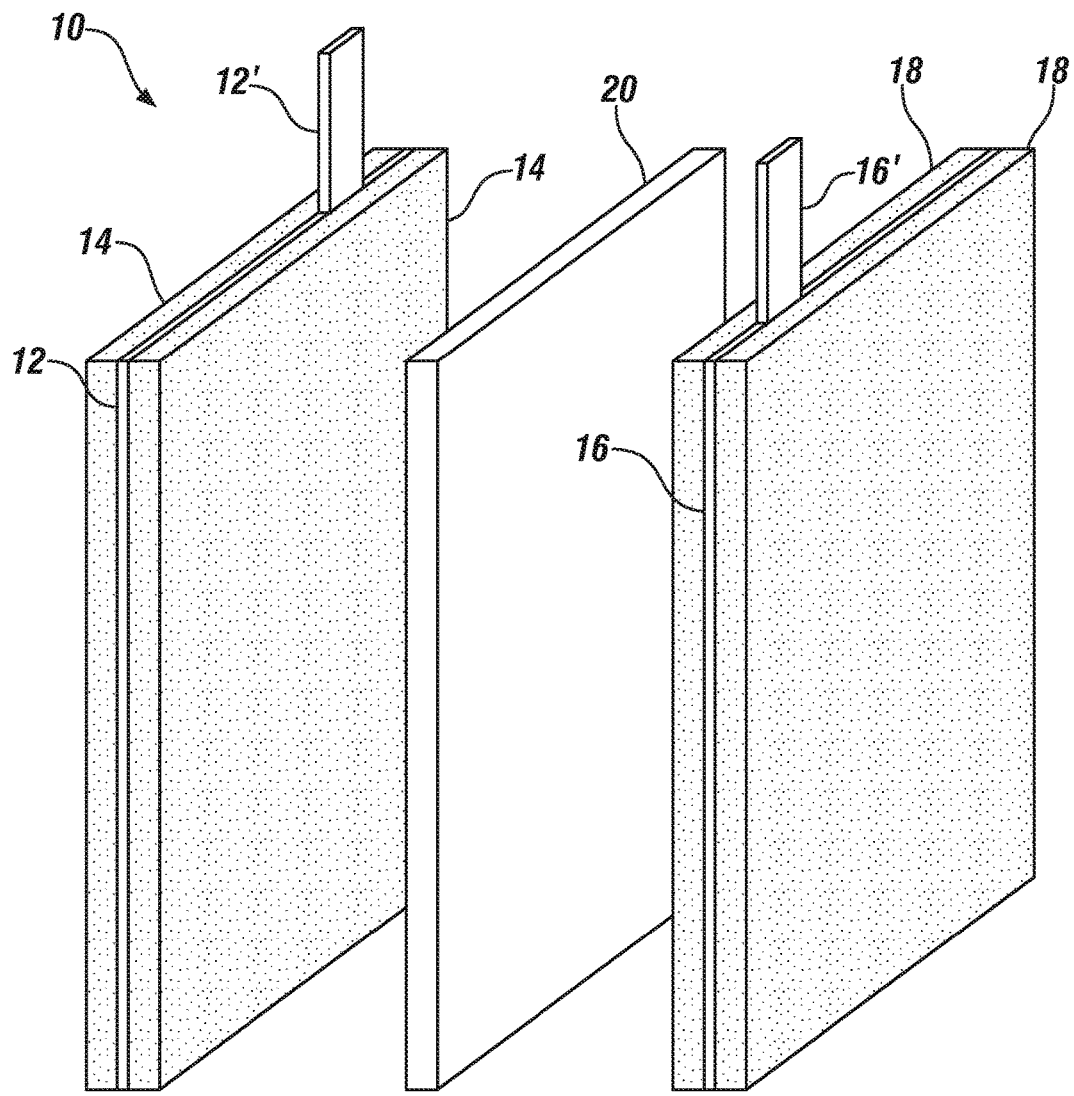
FIG. 3 is a schematic illustration of a spaced apart assembly of three solid members of a lithium metal particle anode-carbon/sulfur composite particle cathode electrochemical battery cell. The anode, opposing cathode and interposed separator are shown spaced apart to better illustrate their structure. This figure does not illustrate the electrolyte solution which would fill the pores of the porous electrode layers and the separator when those members are pressed together in an assembled operating cell.

FIG. 3 is an enlarged schematic illustration of a spaced-apart assembly 10 of an anode, cathode, and separator (20) of an exemplary lithium-sulfur electrochemical battery cell in which the cathode is prepared in accordance with this disclosure and invention. The three solid members are spaced apart in this illustration to better show their structure. The illustration does not include an electrolyte solution whose composition and function will be described in more detail below in this specification.

In FIG. 3, the anode, the negative electrode during discharge of the cell, is formed of uniformly-thick, porous layers of particles of lithium metal anode material 14, deposited and resin bonded on both major surfaces of a relatively thin, conductive metal foil current collector 12. For example, the lithium metal anode particles, and any conductive carbon particles or other additives, may be resin-bonded, for example, to the current collector by preparing a slurry of the particles in a solution of polyvinylidene difluoride (PVDF) dispersed or dissolved in N-methyl-2-pyrrolidone and applying the slurry as a porous layer (a precursor of anode layer 14) to the surfaces of the current collector 12 and removing the solvent. In other embodiments, not illustrated in FIG. 3, the anode may be formed of a lithium metal foil.

The negative electrode current collector 12 is typically formed of a thin layer of copper foil. The thickness of the metal foil current collector is suitably in the range of about ten to twenty-five micrometers. The current collector 12 has a desired two-dimensional plan-view shape for assembly with other solid members of a cell. Current collector 12 is illustrated as having a major surface with a rectangular shape, and further provided with a connector tab 12' for connection with other electrodes in a grouping of lithium-ion cells to provide a desired electrical potential or electrical current flow.

As illustrated in FIG. 3, the layers of lithium metal anode material 14 are typically co-extensive in shape and area with the main surface of their current collector 12. The particulate electrode material has sufficient porosity to be infiltrated by a liquid, non-aqueous, lithium-ion containing electrolyte. In accordance with embodiments of this invention, the thickness of the rectangular layers of lithium metal negative electrode material may be up to about two hundred micrometers so as to provide a desired current and power capacity for the anode.

A cathode is shown, comprising a current collector foil 16 (which is positively charged during discharge of the cell) and, on each major face, a coextensive, overlying, porous deposit 18 of a mixture of particles of carbon/sulfur composite particles graphite particles. The mixed particles are bonded to each other and to an aluminum current collector foil 16 with a PVA-PEO copolymer as described above in this specification. Positive current collector foil 16 also has a connector tab 16' for electrical connection with other electrodes in a grouping of like lithium-sulfur cells or with other electrodes in other cells that may be packaged together in the assembly of a lithium-sulfur battery. The cathode collector foil 16 and its opposing coated porous layers of sulfur-based particles 18 are typically formed in a size and shape that are complementary to the dimensions of an associated negative electrode. In the illustration of FIG. 3, the two electrodes are identical in their shapes and assembled in a lithium-sulfur cell with a major outer surface of the anode material 14 facing a major outer surface of the cathode material 18. The thicknesses of the rectangular layers of positive electrode material 18 are typically determined to complement the anode material 14 in producing the intended electrochemical capacity of the lithium-sulfur cell. The thicknesses of current collector foils are typically in the range of about 10 to 25 micrometers. And the thicknesses of the respective electrode materials are typically up to about 200 micrometers.

Thus, an improved method has been provided for preparing cathodes for a lithium-sulfur battery cell in which sulfur-based particles are resin-bonded in porous layers to a compatible current collector foil. The selected resin, a commercially-available copolymer of polyethylene oxide and polyvinyl alcohol is dissolved in suitable amount of water, mixed with suitably sized sulfur-based cathode particles and the resulting slurry applied to surfaces of the current collector metal. In most situations, evaporation of the water, or other solvent medium, produces the desired porous coating of particles of sulfur-based cathode material.

The above examples illustrate practices of the improved method and improved cathode materials, but are not to be considered as limiting the scope of the invention. For example, our PVA-PEO copolymer resin bonded, sulfur-based cathode materials may be used in combination with other suitable electrolyte materials. And the sulfur-based cathode materials may be prepared in a variety of known practices.

The invention claimed is:

1. A method for forming a cathode for a lithium-sulfur battery cell, the method comprising:
 preparing a mixture of cathode material particles comprising sulfur particles embedded in the pores of carbon particles as composite carbon/sulfur particles;
 forming a slurry of the composite carbon/sulfur particles in a solution consisting of a copolymer of polyvinyl alcohol and polyethylene oxide in water;
 applying the slurry to a surface of a metal current collector to form a porous wet coating layer of resin-wetted composite carbon/sulfur particles on the surface of the metal current collector; and
 evaporating the water to form a porous layer of carbon/sulfur particles bonded by the copolymer to each other and to the surface of the metal current collector.

2. A method as stated in claim 1 in which graphite particles are mixed with the carbon/sulfur particles.

3. A method as stated in claim 1 in which the solution consisting of a copolymer of polyvinyl alcohol and polyethylene oxide in water consists of five percent by weight of the copolymer.

4. A method as stated in claim 1 in which the copolymer comprises two percent by weight of the carbon/sulfur particles in the dried porous layer bonded to the surface of the metal current collector.

5. A method as stated in claim 1 in which the metal current collector is an aluminum foil.

6. A method as stated in claim 1 in which the copolymer of polyvinyl alcohol and polyethylene oxide has a molecular weight of about 45,000 Daltons and consists of about 75% polyvinyl alcohol units and 25% of polyethylene oxide units.

7. A lithium-sulfur electrochemical battery cell comprising a lithium metal anode and a sulfur cathode, the sulfur cathode comprising:
 sulfur particles embedded in pores of carbon particles as composite carbon/sulfur particles, the composite carbon/sulfur particles being bonded as a porous layer to a surface of a metallic current collector, the composite carbon/sulfur particles being bonded to each other and to the surface of the current collector solely by a copolymer of polyvinyl alcohol and polyethylene oxide.

8. A lithium-sulfur electrochemical battery cell as stated in claim 7 in which graphite particles are mixed with the composite carbon/sulfur particles which are bonded in the porous layer to the surface of the metal current collector.

9. A lithium-sulfur electrochemical battery cell as stated in claim 7 in which the copolymer comprises two percent by weight of the carbon/sulfur composite particles which are bonded in the porous layer to the surface of the metal current collector.

10. A lithium-sulfur electrochemical battery cell as stated in claim 7 in which the lithium metal anode and sulfur cathode are wetted with a solution of a lithium electrolyte salt dissolved in equal volume portions of 1,2-dimethyloxyethane and dioxolane.

11. A lithium-sulfur electrochemical battery cell as stated in claim 7 in which the metal current collector is an aluminum foil.

12. A lithium-sulfur electrochemical battery cell as stated in claim 7 in which the lithium electrolyte compound is lithium bis(trifluoromethane sulfonyl) imide.

13. A lithium-sulfur electrochemical battery cell as stated in claim 7 in which the copolymer of polyvinyl alcohol and polyethylene oxide has a molecular weight of about 45,000 Daltons and consists of about 75% polyvinyl alcohol units and 25% of polyethylene oxide units.

14. A method for forming a cathode for a lithium-sulfur battery cell, the cathode being formed to be used in combination with a lithium metal anode in assembled lithium-sulfur battery cell, the method comprising:
 preparing a mixture of sulfur particles with porous carbon particles, the carbon particles having diameters less than one micrometer and a surface area greater than 500 m$^2$/g;
 temporarily melting the sulfur particles in the mixture such that the molten sulfur as absorbed into the pores of carbon particles and subsequently solidified to form composite carbon/sulfur particles as the active cathode material for the lithium-sulfur battery cell;
 forming a slurry of the composite carbon/sulfur particles in a solution consisting of a copolymer of polyvinyl alcohol and polyethylene oxide in water;
 applying the slurry to a surface of a metal current collector to form a porous wet coating layer of resin-wetted composite carbon/sulfur particles on the surface of the metal current collector; and evaporating the water to form a porous layer of carbon/sulfur particles bonded by the copolymer to each other and to the surface of the metal current collector.

15. A method as stated in claim 14 in which the porous carbon particles initially have average diameters of less than one hundred nanometers.

16. A method as stated in claim 14 in which the porous carbon particles initially have average diameters of less than one hundred nanometers and a porosity of up to 800 $m^2/g$.

17. A method as stated in claim 14 in which graphite particles are mixed with the carbon/sulfur particles.

18. A method as stated in claim 14 in which the copolymer comprises two percent by weight of the carbon/sulfur particles in the dried porous layer bonded to the surface of the metal current collector.

19. A method as stated in claim 14 in which the metal current collector is an aluminum foil.

20. A method as stated in claim 14 in which the copolymer of polyvinyl alcohol and polyethylene oxide has a molecular weight of about 45,000 Daltons and consists of about 75% polyvinyl alcohol units and 25% of polyethylene oxide units.

\* \* \* \* \*